Figure 1:
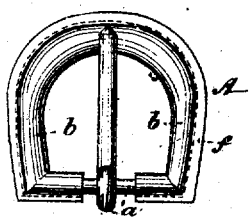
Figure 2:
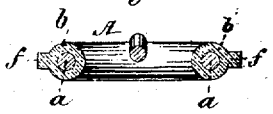

R. C. DUNHAM.

Manufacture of Rubber-Coated Buckles, Rings, &c.

No. 5,173. Reissued Dec. 3, 1872.

Witnesses:

V. C. Clayton
J. G. Clayton

Ralph C. Dunham,
Inventor:
Andrew Albright,
Assignee,
by Atty. J. C. Clayton

UNITED STATES PATENT OFFICE.

RALPH C. DUNHAM, OF NEW BRITAIN, CONNECTICUT, ASSIGNOR, BY MESNE ASSIGNMENTS, TO ANDREW ALBRIGHT.

IMPROVEMENT IN PROCESSES OF APPLYING HARD RUBBER TO BUCKLES, RINGS, &c.

Specification forming part of Letters Patent No. 58,619, dated October 9, 1866; reissue No. 5,173, dated December 3, 1872.

DIVISION B.

*To all whom it may concern:*

Be it known that RALPH C. DUNHAM, of New Britain, Connecticut, has invented an Improved Process of Manufacturing Rings and Buckles Covered with Vulcanized Rubber or Gutta-Percha, of which the following is a specification:

This invention consists in the process of coating metallic rings and buckles with a coating of vulcanized rubber, gutta-percha, or other known vulcanizable gum.

Metallic rings and buckles have heretofore been protected from rust chiefly by leather, by lacquer, or by gold or silver plating.

A coating of vulcanized rubber, gutta-percha, or other suitable vulcanizable gum is much better, and is applied as follows: The article to be "coated" is first cleaned by washing and drying, so that there shall be no impurities between the metal and the coating. The usual rubber and sulphur composition, of a pasty consistence, is then applied to the cleaned article, making the coating a little thicker than it is to be ultimately, so as to allow for polishing down. The rubber paste I prefer to consist of about two parts of rubber to one part of sulphur; the best results being attained when the rubber is in excess.

The "paste" may be of almost any consistency; so stiff as to need pressure by molds to make it conform to the metal, (or it may be thinner.) I prefer to use it about the consistence of stiff dough, as usual, in making articles of hard rubber. When the stiff paste is used it is applied in sheets to the ring or buckle, the paste being cut out of rolled sheets. It is not essential, however, to use the paste in this form. But the paste should be made by pressure to adhere closely to the metal, by the hands of the workman or otherwise. The article thus coated with vulcanizable gum is then placed in a mold to keep the coating of paste in proper proportion and thickness. When the paste is sufficiently stiff or dried, after being applied to the metal, the molds need not be used.

The coated articles (with or without molds) are then put into the vulcanizer, which should have the usual vulcanizing temperature, and remain from six to ten hours until the coating is vulcanized to the desired hardness.

The rings and buckles thus coated with vulcanized rubber or gutta-percha are then removed from the oven and then "tumbled," "finished," and "polished" like other articles made of hard rubber.

What I claim as the invention of RALPH C. DUNHAM is—

The process herein described of coating metallic rings and buckles with vulcanized rubber, gutta-percha, or other known vulcanizable gum.

In testimony whereof I have hereunto set my hand this 14th day of November, 1872.

ANDREW ALBRIGHT,
*Assignee of Ralph C. Dunham.*

Witnesses:
J. C. CLAYTON,
T. B. BEECHER.